United States Patent
Morton et al.

(10) Patent No.: US 10,638,265 B1
(45) Date of Patent: Apr. 28, 2020

(54) TECHNIQUES FOR PERFORMING GEO LOCATION AMONG MULTIPLE GPS ENABLED COMMUNICATION DEVICES

(71) Applicant: Republic Wireless, Inc., Raleigh, NC (US)

(72) Inventors: Travis Morton, Cary, NC (US); Justin Milam, Burgaw, NC (US); Sai Rathnam, Raleigh, NC (US)

(73) Assignee: Republic Wireless, Inc., Raleigh, NC (US)

( * ) Notice: Subject to any disclaimer, the term of this patent is extended or adjusted under 35 U.S.C. 154(b) by 0 days.

(21) Appl. No.: 16/710,409

(22) Filed: Dec. 11, 2019

(51) Int. Cl.
*H04W 4/02* (2018.01)
*H04W 4/029* (2018.01)
*G01S 19/51* (2010.01)

(52) U.S. Cl.
CPC ............. *H04W 4/023* (2013.01); *G01S 19/51* (2013.01); *H04W 4/026* (2013.01); *H04W 4/029* (2018.02); *H04M 2250/10* (2013.01)

(58) Field of Classification Search
CPC ..... H04W 4/023; H04W 4/029; H04W 4/026; G01S 19/51
USPC ...................................................... 340/539.1
See application file for complete search history.

(56) References Cited

U.S. PATENT DOCUMENTS

| | | | | |
|---|---|---|---|---|
| 5,077,703 A | * | 12/1991 | Strauss | G01S 3/046 367/118 |
| 9,494,436 B2 | * | 11/2016 | Yanku | G01C 21/26 |
| 2008/0055155 A1 | * | 3/2008 | Hensley | A01K 11/008 342/357.31 |
| 2010/0318293 A1 | * | 12/2010 | Brush | G01C 21/165 701/431 |
| 2011/0279323 A1 | * | 11/2011 | Hung | G01S 19/14 342/451 |
| 2019/0383608 A1 | * | 12/2019 | Nguyen | G01C 17/28 |

* cited by examiner

*Primary Examiner* — Kerri L McNally
(74) *Attorney, Agent, or Firm* — Gregory Stephens; Greg Stephens (57) ABSTRACT

Techniques are disclosed for tracking location data among a plurality of communication devices communicable with a communication server. A plurality of communication devices may be linked into a group. The communication server may receive location data for each of the plurality of communication devices and calculate a distance and heading data between each of the plurality of communication devices. This data may be distributed to each of the plurality of communication devices in the group. A first communication device in the group may include a ring of light emitting diodes (LEDs), a microphone, and a speaker but lack a display screen. The first communication device may receive the location, distance, and heading data from the communication server while also determining its own orientation via a magnometer. The first communication device may calculate a heading offset between its orientation and a second communication device. The first communication device may then display the directional heading of the second communication device in relation to itself using the LEDs.

15 Claims, 7 Drawing Sheets

TECHNIQUES FOR PERFORMING GEO LOCATION AMONG MULTIPLE GPS ENABLED COMMUNICATION DEVICES

TECHNICAL FIELD

Examples described herein are generally related to techniques for providing geo-location data among a plurality of portable communication devices that lack display capabilities.

BACKGROUND

Locating people in emergency or non-emergency situations may be a desired feature for communication enabled devices. For instance, parents may wish to be able to locate and track their children in many situations. Even adults may wish to know the location of one another in certain situations. Take, for example, cases in which one or more people are hiking, camping, skiing, hunting, or otherwise engaged in outdoor activities. Unfortunately, people often get lost or venture too far away from a group and become disoriented. Some of these situations escalate into search parties for the lost individual or a general desire to find another individual. When this happens, it would be beneficial if the lost or sought after individual had a communication device capable of broadcasting its location to a one or more communication devices configured to receive that location.

What is needed are techniques for easily and intuitively providing location and tracking data among a plurality of communication devices.

DETAILED DESCRIPTION

The systems and methods of the invention may be embodied in and performed by portable communication devices alone or in conjunction with network based communication server(s) and other related components (e.g., databases), and software instructions executed by some or all of such devices and components, as will be explained in detail below. The different types of networks contemplated herein include, for example, IP based cellular mobile networks, and IP data networks, such as the Internet or other IP-based networks, including wide area networks, local area networks, and combinations thereof that include wireless 802.11 and wireless IP cellular means of access over a wide ranging spectrum of bandwidth.

As used herein the term "portable communication device" generally indicates a screenless end user physical device (e.g., endpoint) intended for, among other things, exchanging location data with other communication devices, communication devices with screens, computer devices, or network endpoints over one or more intra- and inter-connected communication networks. A portable communication device may be equipped with multiple RF transceivers including an 802.11 WiFi transceiver, a cellular banded transceiver, Bluetooth transceiver, a LoRa® transceiver and near field communication (NFC) capability. Long Range (LoRa) is a wireless technology mainly targeted for M2M and IoT networks. Other similar RF transceivers configured to use various frequency ranges may also be implemented on the portable communication device as they are developed. For the sake of clarity, a portable communication device may encompass a computer device equipped with at least one RF radio or Ethernet connection. This includes, but is not necessarily limited to mobile phones, smartphones, tablets, laptops, smartwatches, IoT devices, desktops, and other special purpose hardware such as, for instance, the aforementioned Relay® device by Republic Wireless®. Other examples may be understood to those of ordinary skill in the art.

Figure 1:
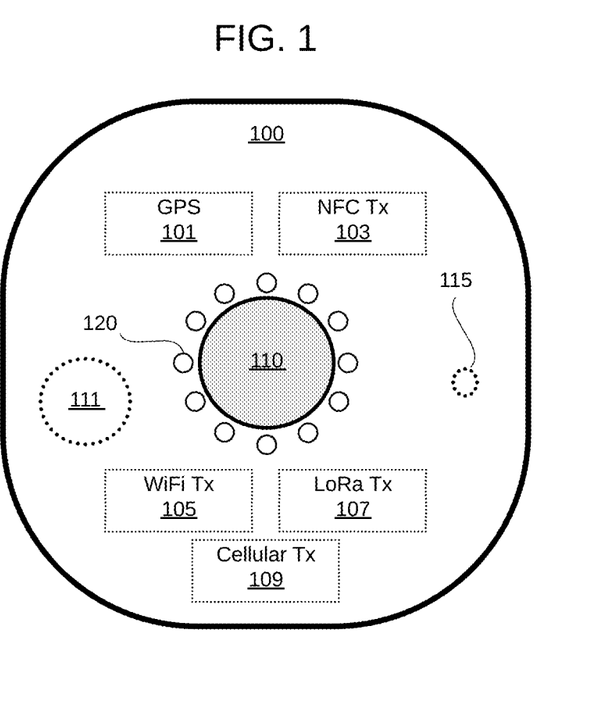
FIG. 1 illustrates a portable communication device according to an embodiment of the invention.

FIG. 1 illustrates a portable communication device 100 according to an embodiment of the invention. In this example, the communication device 100 is screenless and includes at least one input button 110. A microphone 115 (or array of microphones) picks up audio (e.g., speech) and a speaker 111 produces sound based on, among other things, received transmissions. A ring of light emitting diodes (LEDs) 120 may surround input button 110 and provides visual indicators for certain modes of operation and data. The ring of LEDs 120 may produce light in multiple colors and intensities. The portable communication device 100 from an internal component point of view may comprise one or more processors (not shown) for executing instructions, processing data, and controlling the functions of the portable communication device 100. A sensor input component (not shown) may receive and send signals and/or data between the processor(s) and the various user input/output components such as a magnometer (not shown), the microphone 115, speaker 111, and LEDs 120. A generalized software component (not shown) may include computer code executable by the processors for controlling and executing the various functions of the portable communications device 100. The software component may also represent downloaded or pre-loaded software applications. The software component may be stored in a storage component (not shown) which may include random access memory (RAM), Read-only memory (ROM), and/or removable storage media. The storage component may also encompass mechanisms like subscriber identity module (SIM) adapted to receive and interface with removable or embedded SIM cards or e-SIMS (not shown). The portable communication device 100 may be powered by a power source such as, for instance, a battery (not shown) that drives the components needing power like the processor(s) and a plurality of RF transceivers 105, 107, 109 and NFC module 103. The RF transceivers 105, 107, 109 may be embedded into chip sets for cellular communication 109, 802.11 WiFi communication 105, LoRa® 107 and Bluetooth (not shown) communication. The NFC module 103 may provide a data exchange capability between two portable communication devices 100 for various purposes including the ability to exchange general identification information and other data. A global positioning system (GPS) module 101 may also be included to receive and provide location coordinate data that may be integrated into location based services provided by the portable communication device 100 independent of or in conjunction with a communication server.

Figure 2:
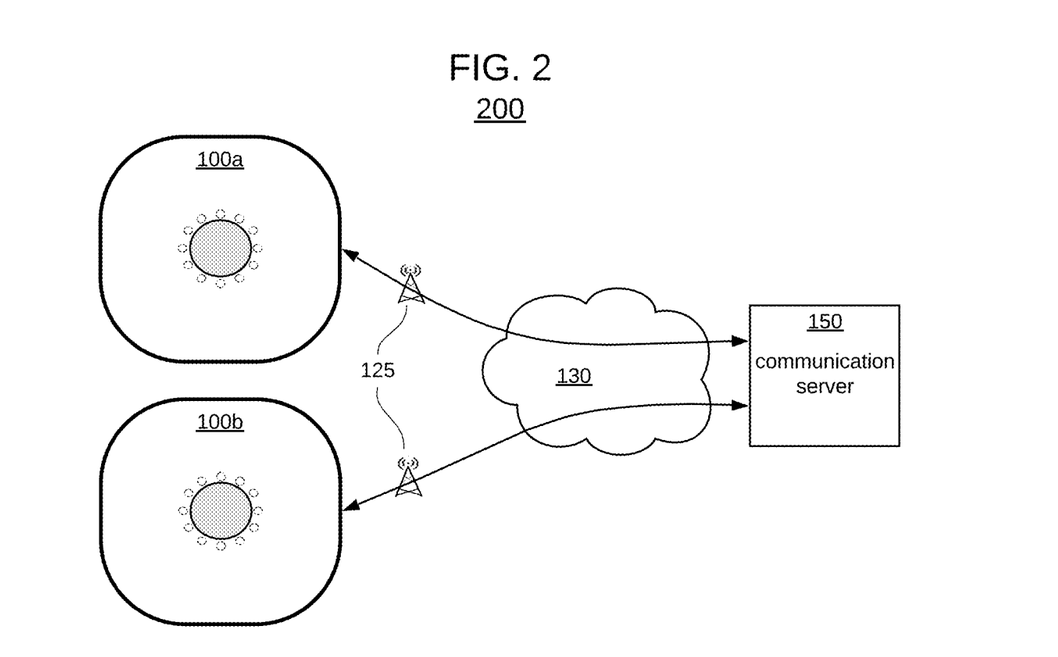
FIG. 2 illustrates a networked environment according to an embodiment of the invention.

FIG. 2 illustrates a networked environment 200 according to an embodiment of the invention. The networked environment 200 may include portable communication devices 100a, 100b operatively coupled to an IP network 130 by way of one or more mobile radio access networks (MRANs) 125 accessible via cellular basestation tower(s).

The MRANs 125 have backhaul IP connectivity to the Internet 130 that provide connectivity with a communication server 150. In certain embodiments, the MRANs include cellular networks or portions of cellular networks based on a variety of circuit switched and/or IP data protocols such as, but not limited to, Global System for Mobile Communications (GSM), Code Division Multiple Access (CDMA), General Packet Radio Service (GPRS), Enhanced Data for GSM Evolution (EDGE), Evolution-Data Optimized (EV-DO), High Speed Packet Data (HSPD), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) and/or any other existing or developed/developing cellular network IP standards—e.g., 5G.

Figure 3:
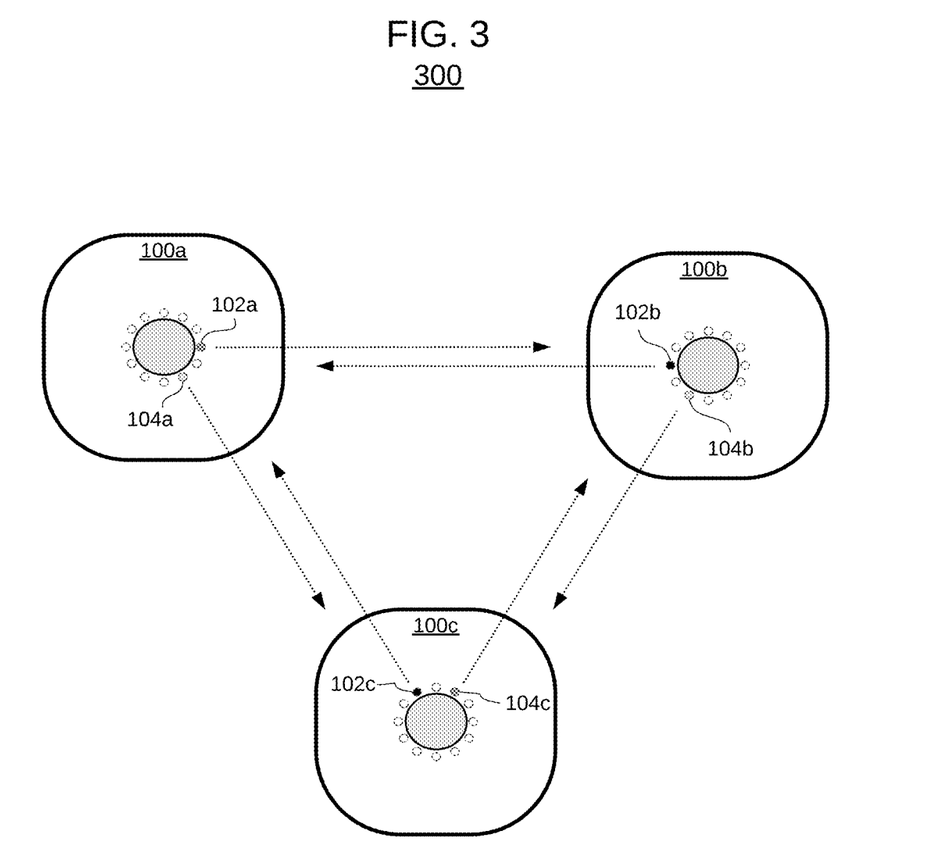
FIG. 3 illustrates a plurality of portable communication devices providing location data to one another according to an embodiment of the invention.

FIG. 3 illustrates a plurality of portable communication devices 100a, 100b, 100c providing location data to one another according to an embodiment of the invention. The portable communication devices 100a, 100b, 100c are shown in a simplified orientation to one another which may be representative of three friends hiking in the woods or three members of a scout troop on a camping trip, etc. The ring of twelve (12) LEDs 120 are arranged like the numbers on a clock spaced 30 degrees apart in a full circle. This arrangement is illustrative and may be altered by design choice to include more or even fewer individual LEDs. In this example, portable communication device 100a has two of its LEDs 102a and 102b lit up. Each LED may be depicted in a different color so the user can distinguish which of the other portable communication devices 100b and 100c are indicated. For instance, LED 102a of portable communication device 100a may be lit in red while LED 102b of portable communication device 100a may be lit in blue. The red LED 102a may be linked to portable communication device 100b while the blue LED 104a may be linked to portable communication device 100c. The arrows of FIG. 3 are there to highlight how the specific LED 102a or 104a tell the user which direction the other portable communication devices 100b and 100c are in relation to the user's portable communication device 100a. In this example and viewing the LED ring 120 as a compass, portable communication device 100b is 90° or due east from portable communication device 100a. Similarly, portable communication device 100c is 150° or southeast from portable communication device 100a.

From the perspective of portable communication device 100b, LED 102b of portable communication device 100b may be lit in white while LED 104b of portable communication device 100b may be lit in blue. The white LED 102b may be linked to portable communication device 100a while the blue LED 104b may be linked to portable communication device 100c. In this example and viewing the LED ring 120 as a compass, portable communication device 100a is 270° or due west from portable communication device 100b. Similarly, portable communication device 100c is 210° or southwest from portable communication device 100b.

Lastly, from the perspective of portable communication device 100c, LED 102c of portable communication device 100c may be lit in white while LED 104c of portable communication device 100b may be lit in red. The white LED 102c may be linked to portable communication device 100a while the red LED 104c may be linked to portable communication device 100b. In this example and viewing the LED ring 120 as a compass, portable communication device 100a is 330° or northwest from portable communication device 100c. Similarly, portable communication device 100b is 30° or northeast from portable communication device 100c.

As each of the users of portable communication devices 100a, 100b, 110c move about, the respective colored LEDs 102 can and will change to reflect any changes in orientation.

Figure 4:
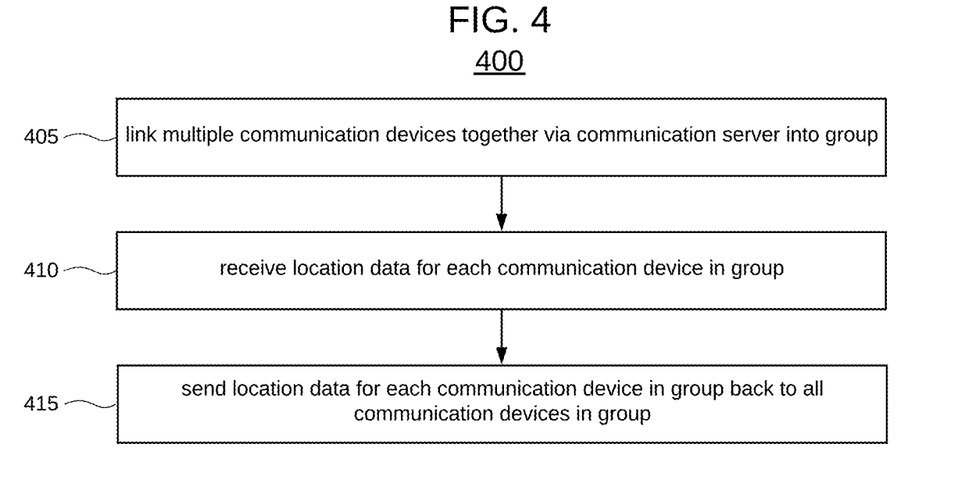
FIG. 4 is a logic flow diagram describing a process for linking multiple portable communication devices into a group and providing location data among them according to an embodiment of the invention.

FIG. 4 is a logic flow diagram describing a process 400 for linking multiple portable communication devices 100a, 100b, 100c into a group and providing location data among them according to an embodiment of the invention. In this example, the communication devices 100a, 100b, 100c may be linked together with the assistance of communication server 150 so long as their connectivity between each communication device 100a, 100b, 100c and the communication server 150. For outdoor activities, this connectivity may take the form of a cellular connection via MRAN/basestation(s) 125.

At operation 405, each communication device 100a, 100b, 100c messages communication server 150 its intent to form a location group with one another. For communication devices under the same master account, this may be achieved by virtue of a companion application executing on a smartphone or other computer device. The companion application may provide a graphical user interface that allows the user to select a location tracking feature and add or link multiple communication devices into a location group. When setting up the group, each user may give the other communication devices in the group names or the names may already be associated with the communication devices. This naming of communication devices greatly assists in distinguishing among the members of the group and may be used in any voice recognition or natural language processing. Once the group has been set up, the communication device will receive and relay the location data of each communication device to all the other communication devices in the group.

At operation 410, communication server 150 receives location data from each communication device 100a, 100b, 100c and sends its at operation 415 to the other communication devices. Specifically, communication device 100a sends its location to communication server 150 and receives the location data of communication devices 100b and 100c.

Similarly, communication device 100b sends its location to communication server 150 and receives the location data of communication devices 100a and 100c. Finally, communication device 100c sends its location to communication server 150 and receives the location data of communication devices 100a and 100b.

If the communication devices are not under the same master account, a communication device may use speech recognition and a command set to send a request to the communication server to set up a location group. The request may include a unique identifier to each of the communication devices that are to be part of the group. For instance, a user may invoke an assistant to send the voice message, "create location group for barking dog, happy panda, and lazy lion. The names barking dog, happy panda, and lazy lion are indicative of identifiers for specific communication devices. The communication device identifiers may be anything that uniquely identifies a communication device to the communication server 150. Once received, the communication server 150 may issue a notification to each communication device regarding the formation of the location group and prompting for a response indicative of consent to join. Once the consent response has been received, the location group is active.

Figure 5:
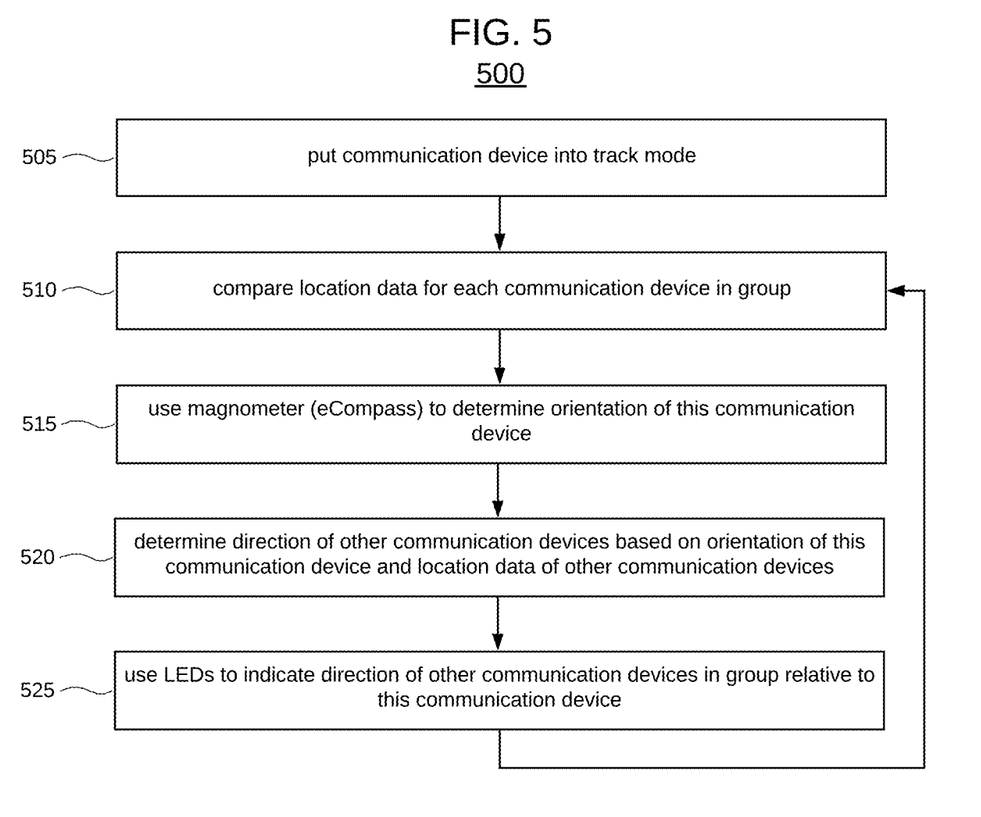
FIG. 5 is a logic flow diagram describing a process for receiving and tracking location data of a linked group of portable communication devices according to an embodiment of the invention.

FIG. 5 is a logic flow diagram describing a process 500 for receiving and tracking location data of a linked group of portable communication devices according to an embodiment of the invention. This embodiment may be implemented for a plurality of communication devices in a linked group. For ease of description, the figures depict a group of three communication devices 100a, 100b, 100c. Moreover, the description below is from the perspective of one of the communication devices 100a in the linked group. At operation 505, the user may put their communication device 100a into tracking mode. Doing so initiates a process of sending out location data to the other communication devices 100b, 100c and receiving the location data of those other communication devices 100b, 100c. The location data may be acquired using the onboard GPS module 101. At operation 510, communication device 100a compares its own location data with that of communication devices 100b and 100c. On a device with a full screen, the results of the comparison may be mapped such that a visual indication of each communication device 100a, 100b, 100c may be overlayed on a map of the area in question. However, the communication devices 100a, 100b, 100c described herein do not have a suitable display for presentation of the location data as described above. Rather, the communication devices 100a, 100b, 100c described herein include a ring of LEDs 120 arranged in a circular pattern. So, while communication device 100a knows the exact location and distance between itself and the other communication devices 100b and 100c, it must determine an orientation that may be presented to the user using the ring of LEDs 120.

At operation 515, communication device 100a determines its own heading. Communication device 100a may be equipped with a magnetometer configured to act as a compass. At operation 520, a directional orientation between communication device 100a and the other communication devices 100b and 100c in the group may be determined. Communication device 100a computes an azimuth to each of the other communication devices 100b and 100c and uses its own magnetometer to compute its own heading. Communication device 100a may then compute an offset between its own heading and the azimuth for each of the other communication devices 100b and 100c. The offset associated with communication devices 100b and 100c provides a positional orientation between communication device 100a and communication devices 100b and 100c. At operation 525, communication device 100a may then use the LED ring 120 to provide the orientation data between communication device 100a and communication devices 100b and 100c. If the ring of LEDs 120 is arranged in an equally spaced circular pattern, the number of individual LEDs may be associated with a compass heading. For example, one can divide the number of individual LEDS by 360 (degrees in a circle) to determine the angular separation between successive individual LEDs. Communication device 100a may, for example, determine the offset between itself and communication device 100b to be 85°. For an LED ring 120 with 12 individual LEDs that are spaced apart by 30°, the closest individual LED to 85° would be the one that is 90°. This individual LED may be lit to provide a coarse heading between communication device 100a and 100b. The same computations may be applied to the location data of communication device 100c. When there are more than one other communication device being tracked, the user must be able to distinguish which individual LEDs pertain to which communication device being tracked. This may be achieved by assigning a different color to each communication device. For instance, communication device 100b may be assigned the color white while communication device 100c may be assigned the color blue. As the users of each communication device 100a, 100b, 100c move about, the process may be frequently repeated by returning control to operation 510.

Figure 6:
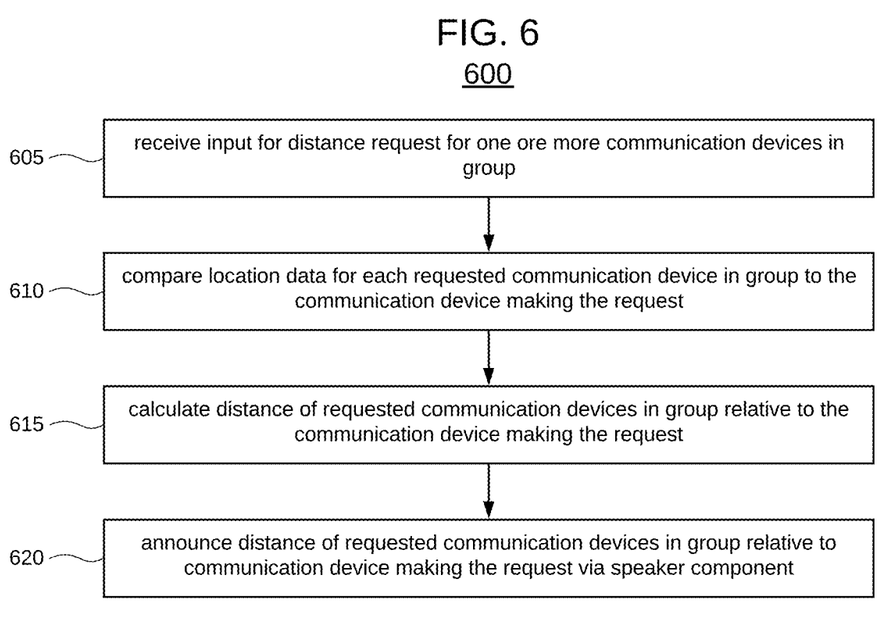
FIG. 6 is a logic flow diagram describing a process for obtaining distance data for a between portable communication devices according to an embodiment of the invention.

FIG. 6 is a logic flow diagram describing a process 600 for obtaining distance data between specific portable communication devices 100a, 100b, 100c according to an embodiment of the invention. At operation 605, communication device 100a receives a distance request for the distance between itself and another communication device 100b or 100c.

The request may be an audible request processed by voice recognition software implementing natural language processing. For instance, a user may invoke a voice assistant on communication device 100a and ask, "How far away is John?" In this example, the voice recognition software interprets the phrase "how far away is john" as a request to provide a distance calculation between the present communication device 100a and John's communication device—e.g., 100b. In another embodiment, the distance request may be initiated using a different or specific keyword or phrase that is tied to a specific command or request (e.g., not natural language processing). In yet another embodiment, the distance request may be initiated by a button or other such mechanism. The request may be for one or more of the communication devices in the group.

At operation 610, communication device 100a compares the location data it previously received (FIG. 4—operation 410) for each requested communication device in the group to the communication device 100a making the request. In this example, the user of communication device 100a may have requested the distance to communication device 100b. At operation 615, communication device 100a calculates a distance between itself and communication device 100b based on the location data for each communication device 100a, 100b. The distance may then be announced at operation 620 by communication device 100a via its speaker component. For instance, the response to the distance request may be, "John is 300 feet away." This information coupled with the LED indicator lets the user know that John may be approximately 300 feet away at a heading of 85°.

The units returned for the distance measurement may be any relevant unit measurement such as feet, yards, meters, miles, kilometers, etc. In another embodiment, the units of distance may be returned in steps. For instance, communication device 100a may include a pedometer function that converts detected motion to steps. The steps may be calculated based on the historical usage of communication device 100a by dividing observed distances with observed number of steps to determine an average step length. With an average step length, communication device 100a can calculate the number of steps needed to reach communication device 100b knowing the exact location of each communication device 100a, 100b. Moreover, the distance request may return audible direction or heading information as well which can provide more precise heading information than the coarse LED indication. For instance, the response to the distance request may be, "John is 300 feet away at a heading of 85°." Or, the response to the distance request may be, "John is 105 steps away at a heading of 85°."

Figure 7:
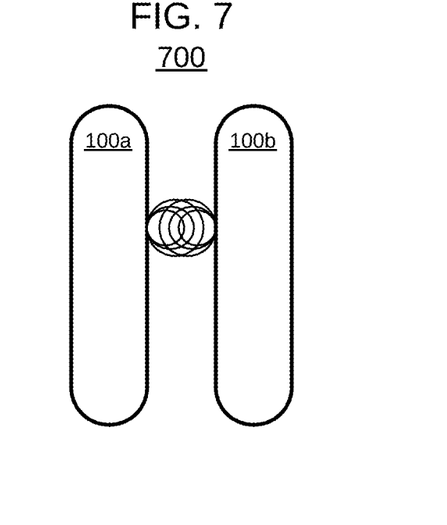
FIG. 7 illustrates portable communication devices using near field communication (NFC) to create a group for providing location data to one another according to an embodiment of the invention.

FIG. 7 illustrates portable communication devices 100a, 100b using near field communication (NFC) to create a group for providing location data to one another according to an embodiment of the invention. Many times the communication devices 100a, 100b, 100c may be used in areas that have little to no cellular connectivity. For instance, a group of friends may be hiking "off the grid" in an area that has no cellular connectivity. In such cases, the ability of the communication devices 100a, 100b, 100c is eliminated unless there is a peer-to-peer or direct communication capability enabled on the communication devices 100a, 100b, 100c. Moreover, the direct communication capability must be robust enough to cover reasonable distances to be effective. Thus, the communication devices 100a, 100b, 100c must include a radio with direct communication capability that covers reasonable distances. One such radio that may be used is a Long Range (LoRa) radio 107 and protocol. LoRa may have an effective range of 1-10 kilometers depending on environmental conditions. One such communication device that incorporates a LoRa radio 107 is the Relay® device sold by Republic Wireless®.

Even with a LoRa radio 107 providing direct communication capability another challenge is to create a group without access to a communication server. The communication devices 100a, 100b, 100c must coordinate themselves into a group. One such technology that is well suited to creating ad-hoc groups is near field communication (NFC). NFC allows devices to exchange data when brought in very close proximity of one another. Referring to FIG. 7, two of the communication devices 100a and 100b are put into a group forming mode and 'bumped' together to exchange identification data so that each communication device is placed into a group with the other for purposes of exchanging location data. To add another communication device like 100c, an NFC bump between it and each of the other communication devices 100a, 100b may be performed. Once all the NFC bumps have been performed, the group of three communication devices 100a, 100b, 100c is formed.

Figure 8:
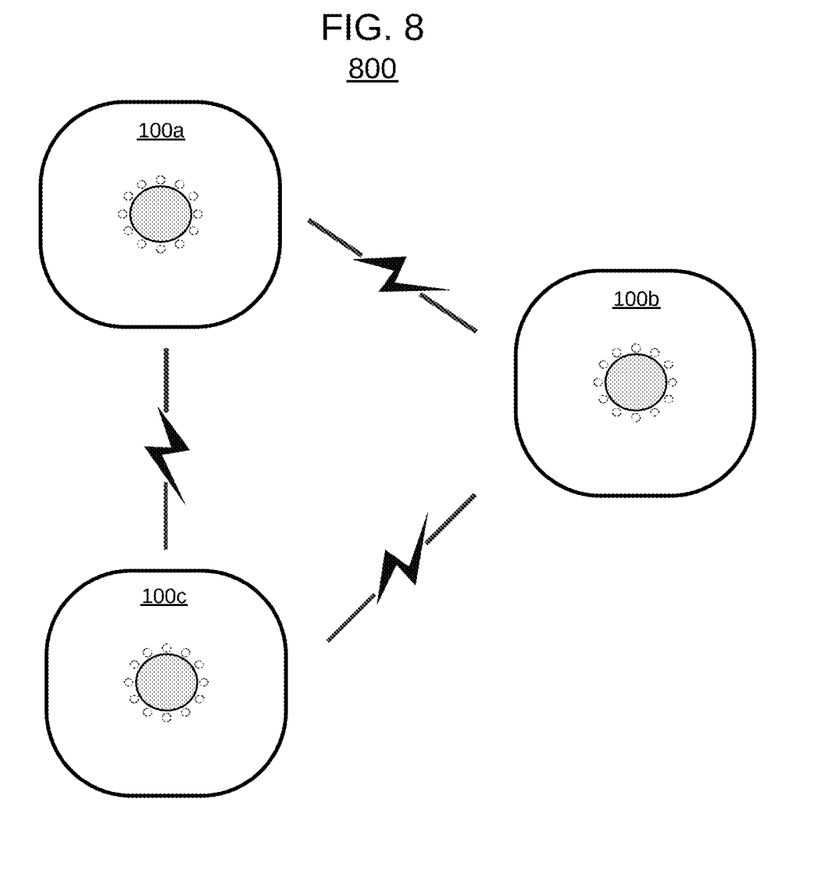
FIG. 8 illustrates a plurality of portable communication devices communicating with and providing location data to one another using a peer-to-peer RF protocol according to an embodiment of the invention.

FIG. 8 illustrates a plurality of communication devices 100a, 100b, 100c communicating with and providing location data to one another using a peer-to-peer RF protocol according to an embodiment of the invention. Each communication device 100a, 100b, 100c periodically obtains and broadcasts its location data to the other communication devices in the group. The location data may be obtained using a GPS module 101 within portable communication device(s) 100a, 100b, 100c. Each communication device 100a, 100b, 100c may broadcast on a peer-to-peer basis using a radio and protocol such as, for instance, LoRa 107.

Figure 9:
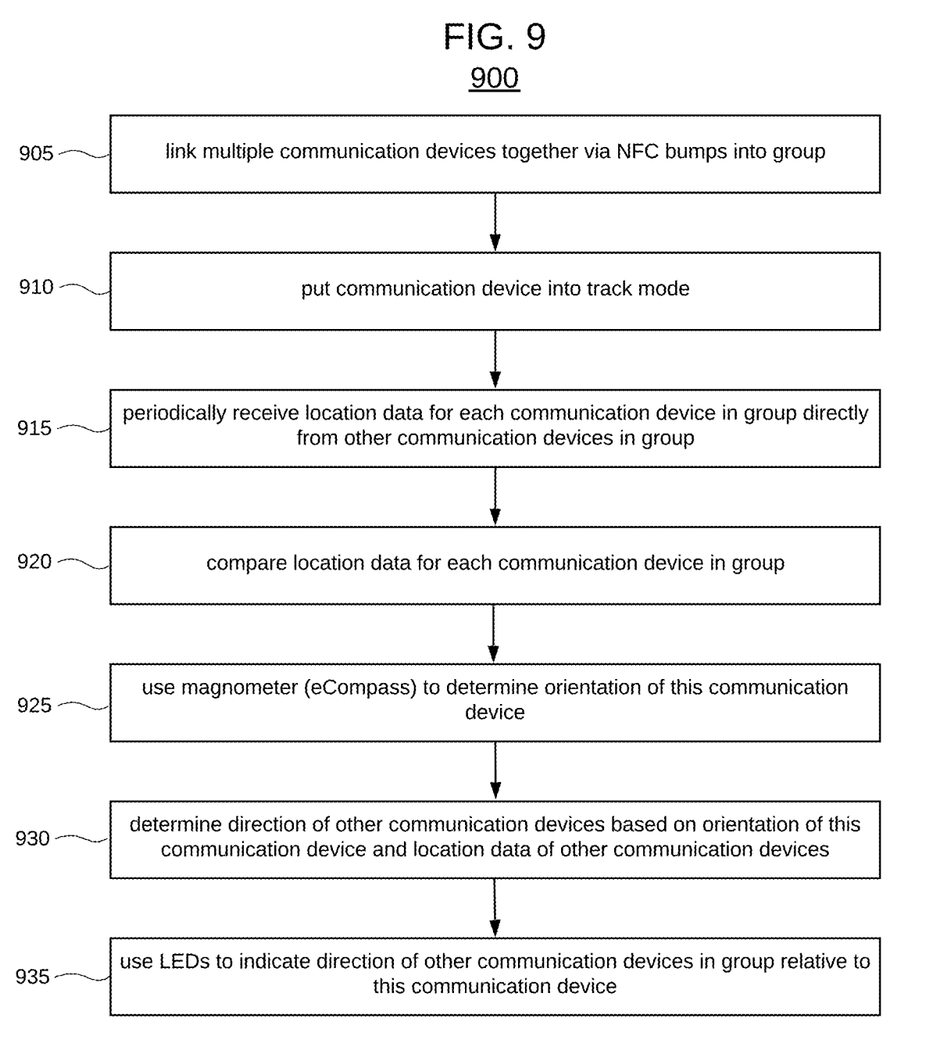
FIG. 9 is a logic flow diagram describing an NFC process for linking multiple portable communication devices into a group and providing location data among them according to an embodiment of the invention.

FIG. 9 is a logic flow diagram describing a process 900 for linking multiple portable communication devices into a group and providing location data among them according to an embodiment of the invention. At operation 905, two of the communication devices 100a and 100b are put into a group forming mode and 'bumped' together to exchange identification data so that each communication device is placed into a group with the other for purposes of exchanging location data. To add another communication device like 100c, an NFC bump between it and each of the other communication devices 100a, 100b may be performed. Once all the NFC bumps have been performed, the group of three communication devices 100a, 100b, 100c is formed.

At operation 910, the user may put their communication device 100a into tracking mode. Doing so initiates a process of sending out location data to the other communication devices 100b, 100c and receiving the location data of those other communication devices 100b, 100c. The location data may be acquired using the onboard GPS module 101.

At operation 915, each communication device 100a, 100b, 100c periodically sends and receives its location data the other communication devices directly over a peer-to-peer fashion. Specifically, communication device 100a sends its location to communication server 150 and receives the location data of communication devices 100b and 100c. Similarly, communication device 100b sends its location to communication server 150 and receives the location data of communication devices 100a and 100c. Finally, communication device 100c sends its location to communication server 150 and receives the location data of communication devices 100a and 100b.

At operation 920, communication device 100a compares its own location data with that of communication devices 100b and 100c. The comparison may entail calculating a distance and heading between the local communication device 100a and the other communications devices 100b, 100c. For instance, the distance/header calculation between local communication device 100a and communications device 100b may yield a result of 300 feet at a heading of 47°.

Because the communication devices 100a, 100b, 100c described herein do not have a suitable display for presentation of the location data as described above, the communication devices 100a, 100b, 100c may utilize the ring of LEDs 120 to present heading or directional data among the communication devices 100a, 100b, 100c. Thus, while communication device 100a knows the exact location and distance between itself and the other communication devices 100b and 100c, it must determine an orientation that may be presented to the user using the ring of LEDs 120.

At operation 925, communication device 100a determines its own heading. Communication device 100a may be equipped with a magnometer configured to act as a compass. At operation 930, a directional orientation between communication device 100a and the other communication devices 100b and 100c in the group may be determined. Communication device 100a computes an azimuth to each of the other communication devices 100b and 100c and uses its own magnometer to compute its own heading. Communication device 100a may then compute an offset between its own heading and the azimuth for each of the other communication devices 100b and 100c. The offset associated with communication devices 100b and 100c provides a positional orientation between communication device 100a and communication devices 100b and 100c. At operation 935, communication device 100a may then use the LED ring 120 to provide the orientation data between communication device 100*a* and communication devices 100*b* and 100*c*. If the ring of LEDs 120 is arranged in an equally spaced circular pattern, the number of individual LEDs may be associated with a compass heading. For example, one can divide the number of individual LEDS by 360 (degrees in a circle) to determine the angular separation between successive individual LEDs. Communication device 100*a* may, for example, determine the offset between itself and communication device 100*b* to be 85°. For an LED ring 120 with 12 individual LEDs that are spaced apart by 30°, the closest individual LED to 85° would be the one that is 90°. This individual LED may be lit to provide a coarse heading between communication device 100*a* and 100*b*. The same computations may be applied to the location data of communication device 100*c*. When there are more than one other communication device being tracked, the user must be able to distinguish which individual LEDs pertain to which communication device being tracked. This may be achieved by assigning a different color to each communication device. For instance, communication device 100*b* may be assigned the color white while communication device 100*c* may be assigned the color blue. As the users of each communication device 100*a*, 100*b*, 100*c* move about, the process may be frequently repeated by returning control to operation 920.

Figure 10:
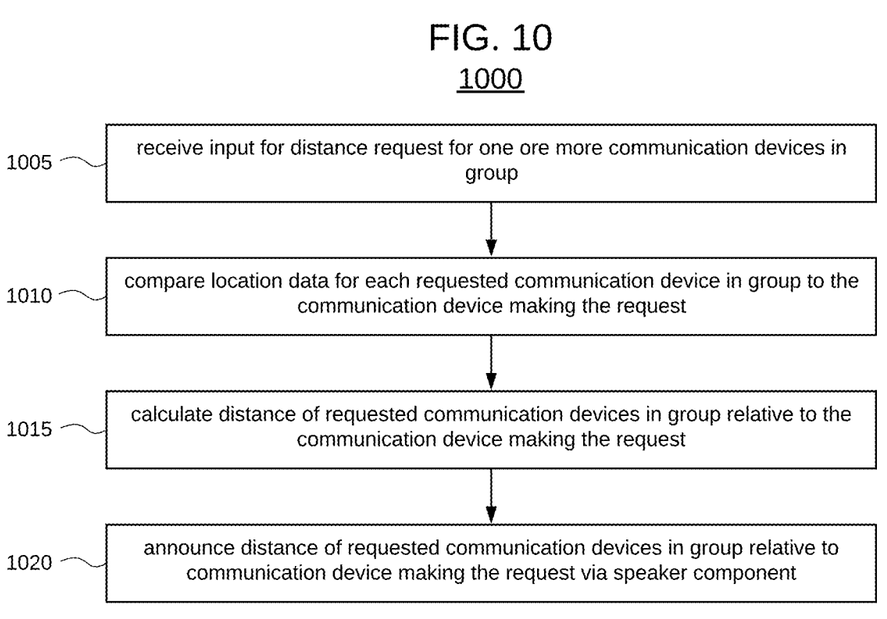
FIG. 10 is a logic flow diagram describing another process for distance data for a specific portable communication device according to an embodiment of the invention.

FIG. 10 is a logic flow diagram describing another process 1000 for distance data for a specific portable communication device according to an embodiment of the invention. This is the same process as described in FIG. 6. In FIG. 6, many of the calculations may be performed by communications server 150 because the communication devices 100*a*, 100*b*, 100*c* are operatively linked and in communication with communication server 150. However, in FIG. 10 the communication devices 100*a*, 100*b*, 100*c* are not communicable with communication server 150 and must perform the calculations locally.

At operation 1005, communication device 100*a* receives a distance request for the distance between itself and another communication device 100*b* or 100*c*. The request may be an audible request processed by voice recognition software implementing natural language processing. For instance, a user may invoke a voice assistant on communication device 100*a* and ask, "How far away is John?" In this example, the voice recognition software interprets the phrase "how far away is john" as a request to provide a distance calculation between the present communication device 100*a* and John's communication device—e.g., 100*b*. In another embodiment, the distance request may be initiated using a different or specific keyword or phrase that is tied to a specific command or request (e.g., not natural language processing). In yet another embodiment, the distance request may be initiated by a button or other such mechanism. The request may be for one or more of the communication devices in the group.

At operation 1010, communication device 100*a* compares the location data it previously received (FIG. 9—operation 920) for each requested communication device in the group to the communication device 100*a* making the request. In this example, the user of communication device 100*a* may have requested the distance to communication device 100*b*. At operation 1015, communication device 100*a* calculates a distance between itself and communication device 100*b* based on the location data for each communication device 100*a*, 100*b*. The distance may then be announced at operation 1020 by communication device 100*a* via its speaker component. For instance, the response to the distance request may be, "John is 300 feet away." This information coupled with the LED indicator lets the user know that John may be approximately 300 feet away at a heading of 85°.

The units returned for the distance measurement may be any relevant unit measurement such as feet, yards, meters, miles, kilometers, etc. In another embodiment, the units of distance may be returned in steps. For instance, communication device 100*a* may include a pedometer function that converts detected motion to steps. The steps may be calculated based on the historical usage of communication device 100*a* by dividing observed distances with observed number of steps to determine an average step length. With an average step length, communication device 100*a* can calculate the number of steps needed to reach communication device 100*b* knowing the exact location of each communication device 100*a*, 100*b*. Moreover, the distance request may return audible direction or heading information as well which can provide more precise heading information than the coarse LED indication. For instance, the response to the distance request may be, "John is 300 feet away at a heading of 85°." Or, the response to the distance request may be, "John is 105 steps away at a heading of 85°."

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores"

may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A method of tracking location data among a plurality of communication devices communicable with a communication server, comprising:
  in the communication server:
    linking a plurality of communication devices into a group, at least one of the communication devices lacking a display screen;
    receiving location data for each of the plurality of communication devices;
    calculating distance and heading data between each of the plurality of communication devices;
    sending the location, distance, and heading data from each of the plurality of communication devices in the group to the other communication devices; and
  in a first communication device including a ring of light emitting diodes (LEDs), a microphone, and a speaker but lacking a display screen:
    receiving the location, distance, and heading data between the first communication device lacking a display screen and at least a second communication device in the group;
    determining the orientation of the first communication device lacking a display screen;
    calculating a heading offset between the orientation of the first communication device lacking a display screen and the second communication device; and
    displaying the directional heading of the second communication device in relation to the first communication device using the LEDs.

2. The method of claim 1, comprising:
  in the first communication device:
    receiving a request to audibly output the distance to the second communication device; and
    audibly outputting the distance using a speaker component.

3. The method of claim 1, comprising:
  in the first communication device:
    receiving a request to audibly output the heading to the second communication device; and
    audibly outputting the heading using a speaker component.

4. The method of claim 1, wherein the location data is received from a GPS component on each of the plurality of communication devices.

5. The method of claim 1, wherein determining the orientation of the first communication device lacking a display screen comprises:
  obtaining data from a magnetometer within the first communication device; and
  converting the magnetometer data to compass data.

6. A communication system configured to track location data among a plurality of communication devices communicable with a communication server, comprising:
  a communication server comprising one or more processors configured to execute instructions to:
    link a plurality of communication devices into a group, at least one of the communication devices lacking a display screen;
    receive location data for each of the plurality of communication devices;
    calculate distance and heading data between each of the plurality of communication devices; and
    send the location, distance, and heading data from each of the plurality of communication devices in the group to the other communication devices;
  a first communication device including a ring of light emitting diodes (LEDs), a microphone, and a speaker but lacking a display screen comprising one or more processors configured to execute instructions to:
    receive the location, distance, and heading data between the first communication device lacking a display screen and at least a second communication device in the group;
    determine the orientation of the first communication device lacking a display screen;
    calculate a heading offset between the orientation of the first communication device lacking a display screen and the second communication device; and
    display the directional heading of the second communication device in relation to the first communication device using the LEDs.

7. The communication system of claim 6, the first communication device comprising one or more processors configured to execute instructions to:
  receive a request to audibly output the distance to the second communication device; and
  audibly output the distance using a speaker component.

8. The communication system of claim 6, the first communication device comprising one or more processors configured to execute instructions to:

receive a request to audibly output the heading to the second communication device; and audibly output the heading using a speaker component.

9. The communication system of claim 6, wherein the location data is received from a GPS component on each of the plurality of communication devices.

10. The communication system of claim 6, the first communication device comprising one or more processors configured to execute instructions to:

obtain data from a magnometer; and convert the magnometer data to compass data.

11. A non-transitory computer-readable medium comprising a plurality of instructions that when executed enable processing circuitry to execute instructions to track location data among a plurality of communication devices communicable with a communication server, the instructions to:

link a plurality of communication devices into a group;

receive location data for each of the plurality of communication devices;

calculate distance and heading data between each of the plurality of communication devices;

send the location, distance, and heading data from each of the plurality of communication devices in the group to the other communication devices;

receive the location, distance, and heading data between a first communication device and at least a second communication device in the group, the first communication device including a ring of light emitting diodes (LEDs), a microphone, and a speaker but lacking a display screen;

determine the orientation of the first communication device;

calculate a heading offset between the orientation of the first communication device and the second communication device; and display, on the first communication device, the directional heading of the second communication device in relation to the first communication device using the LEDs.

12. The non-transitory computer-readable medium of claim 11 further comprising a plurality of instructions that when executed enable processing circuitry to:

receive a request to audibly output the distance to the second communication device; and audibly output the distance using a speaker component.

13. The non-transitory computer-readable medium of claim 11 further comprising a plurality of instructions that when executed enable processing circuitry to:

receive a request to audibly output the heading to the second communication device; and audibly output the heading using a speaker component.

14. The non-transitory computer-readable medium of claim 11, wherein the location data is received from a GPS component on each of the plurality of communication devices.

15. The non-transitory computer-readable medium of claim 11 further comprising a plurality of instructions that when executed enable processing circuitry to:

obtain data from a magnometer on the first communication device; and convert the magnometer data to compass data.

* * * * *